US008839097B2

United States Patent
Sukach et al.

(10) Patent No.: US 8,839,097 B2
(45) Date of Patent: Sep. 16, 2014

(54) SYSTEM AND METHOD FOR INFORMATION ENCAPSULATION FOR PROVIDING MULTIPLE DELIVERABLE FORMATS FROM ONE INFORMATION SOURCE

(75) Inventors: Rebecca Sukach, Plano, TX (US); Robert P. Kennedy, Fox River Grove, IL (US)

(73) Assignee: CA, Inc., Islandia, NY (US)

( * ) Notice: Subject to any disclaimer, the term of this patent is extended or adjusted under 35 U.S.C. 154(b) by 1203 days.

(21) Appl. No.: 10/988,942

(22) Filed: Nov. 15, 2004

(65) Prior Publication Data

US 2006/0107202 A1 May 18, 2006

(51) Int. Cl.
*G06F 17/00* (2006.01)
*G06F 17/24* (2006.01)
*G06F 17/21* (2006.01)
*G06F 17/22* (2006.01)

(52) U.S. Cl.
CPC .............. *G06F 17/24* (2013.01); *G06F 17/211* (2013.01); *G06F 17/2264* (2013.01)
USPC ........... 715/249; 715/255; 715/234; 715/243; 715/201

(58) Field of Classification Search
CPC .... G06F 17/24; G06F 17/211; G06F 17/2264
USPC ................. 715/513, 517, 523, 234, 243, 249, 715/200–205
See application file for complete search history.

(56) References Cited

U.S. PATENT DOCUMENTS

| | | | | |
|---|---|---|---|---|
| 5,633,996 | A | 5/1997 | Hayashi et al. | 395/774 |
| 6,336,124 | B1 * | 1/2002 | Alam et al. | 715/205 |
| 6,480,885 | B1 * | 11/2002 | Olivier | 709/207 |
| 2002/0095444 | A1 * | 7/2002 | Mantaro | 707/515 |
| 2003/0007397 | A1 * | 1/2003 | Kobayashi et al. | 365/200 |
| 2005/0132272 | A1 * | 6/2005 | Bodin et al. | 715/513 |
| 2005/0251737 | A1 * | 11/2005 | Kobayashi et al. | 715/513 |
| 2006/0048042 | A1 * | 3/2006 | Sembower et al. | 715/500 |
| 2006/0271502 | A1 * | 11/2006 | Yajima | 707/2 |
| 2008/0256120 | A1 * | 10/2008 | Kobayashi et al. | 707/102 |

OTHER PUBLICATIONS

PCT Notification of Transmittal of the International Search Report and the Written Opinion of the International Searching Authority, or the Declaration, for International Application No. PCT/US2005/040903, 11 pages, Jun. 30, 2006.
Oetiker et al.; The Not So Short Introduction to LATEX 2 ∈; XP-002383990; 131 pages, Apr. 4, 2004.

(Continued)

*Primary Examiner* — Cesar Paula
*Assistant Examiner* — David Faber
(74) *Attorney, Agent, or Firm* — Baker Botts, L.L.P.

(57) ABSTRACT

A method for encapsulating information is provided for producing multiple deliverable formats from one information source. The information is encapsulated with associated descriptor elements and descriptor atoms. The method of the present disclosure is directed toward providing an efficient and consistent workflow for producing technical documentation and manuals which are generally required to be in multiple formats ranging from printed manuals to proprietary help files such as PDF, JavaHelp and Windows Help from a single documentation source. Preferably, the method of the present disclosure is dimensioned as a software component or application executed by a computer system with minimal interaction from an operator.

33 Claims, 9 Drawing Sheets

(56) References Cited

OTHER PUBLICATIONS

George E. Miller, "The Magical Number Seven, Plus or Minus Two: Some Limits on Our Capacity for Processing Information", The Psychological Review, 1956, vol. 63, pp. 81-97.
Robert E. Horn, "Information Mapping," *Training in Business and Industry*, vol. 11, No. 3, Mar. 1974, 8 pages.
Peter Cabena et al., "Intelligent Miner for Data Applications Guide," *International Business Machines Corporation*, Mar. 1999, 175 pages.
Ann Rockley, "The Impact of Single Sourcing and Technology," *Technical Communication*, vol. 48, No. 2, May 2001, pp. 189-193.

\* cited by examiner

| Descriptor Element | Description |
|---|---|
| CODE | Defines commands or code syntax and definitions |
| CONCEPT | Defines and explains an idea |
| FAQ | Defines frequently asked questions that illuminate important aspects of the subject |
| GLOSSARY | Defines unique terms used in the reference |
| GRAPHICS | Provides a visual representation of an idea or process |
| ITEM | Defines a part of an object, such as a button on a GUI or a command parameter |
| MESSAGE | Defines text communications sent by the program and displayed to the user |
| PRINCIPLE | Defines short, important hints on what should or should not be done |
| PROCEDURE | Defines a series of performable steps |
| PROCESS | Defines and explains a series of events, stages or phases |
| RELATED_TOPIC | Links information from one element to another, related, element |
| STRUCTURE | Defines a physical object that can be further broken into parts |
| TRANSITION | Links two elements for providing content flow between elements (ONLY IN PRINTED OUTPUT) |

FIG. 3: CODE ELEMENT

| Atom | Description | Required |
|---|---|---|
| COMMAND_NAME | Identifies the name of the command | YES |
| COMMAND_SYNTAX | Identifies the syntax of the command; includes special characters | YES |
| ITEM | Describes the function of the command | YES |
| PARAMETER_LIST | Identifies a list of the items used by the command | NO |
| PARAGRAPH | Describes the command in further detail | NO |
| ITEM | Describes an item listed in the PARAMETER_LIST | NO |
| SUBPARAMETER | Identifies a bulleted list of items used by a PARAMETER_LIST item | NO |

FIG. 4: CONCEPT ELEMENT

| Atom | Description | Required |
|---|---|---|
| CONCEPT_TITLE | Identifies the concept | YES |
| CONCEPT_DEF | Defines the critical attributes of the concept | YES |
| EX_PARAGRAPH | Describes the attributes of the concept or further clarifies the concept | NO |
| PRINCIPLE | Short, important hints on what should or should not be done | NO |
| GRAPHICS | Linked pictures or other graphical elements illustrating the critical attributes of the concept | NO |

FIG. 5: FAQ ELEMENT

| Atom | Description | Required |
|---|---|---|
| FAQ_Q | Identifies the text of the question | YES |
| FAQ_A | Identifies the text of the answer to the question | YES |
| FAQ_PARAGRAPH | Identifies additional description | NO |
| PROCEDURE | Identifies a numbered list to describe a procedure | NO |
| PRINCIPLE | Short, important hints on what should or should not be done | NO |
| GRAPHICS | Linked pictures or other graphical elements illustrating the critical attributes of the FAQ | NO |

FIG. 6: GLOSSARY ELEMENT

| Atom | Description | Required |
|---|---|---|
| GLOSSARY_TERM | Identifies the term being defined | YES |
| GLOSSARY_TEXT | Identifies the definition of the term | YES |

FIG. 7: GRAPHICS ELEMENT

| Atom | Description | Required |
|---|---|---|
| GRAPHIC_TITLE | Identifies the Graphic | YES |
| GRAPHIC | Contains the actual drawing or a path to the graphic file | YES |

FIG. 8: ITEM ELEMENT

| Atom | Description | Required |
|---|---|---|
| ITEM_TITLE | Identifies the item | YES |
| ITEM_DESCRIPT | Identifies the function or use of the item | YES |
| PRINCIPLE | Short, important hints on what should or should not be done | NO |
| GRAPHICS | Linked pictures or other graphical elements illustrating the critical attributes of the item | NO |

FIG. 9: MESSAGE ELEMENT

| Atom | Description | Required |
|---|---|---|
| MESSAGE_NUM | Identifies the number associated with the message, if present | YES |
| MESSAGE_TEXT | Identifies the text of the message | YES |
| MESSAGE_REASON | Identifies possible causes of the error condition, notification or user action | YES |
| PROCEDURE | Identifies a list to describe a procedure to correct the error or to describe possible answers or actions | NO |
| MESSAGE_PARAGRAPH | Identifies additional information | NO |
| PRINCIPLE | Short, important hints on what should or should not be done | NO |

FIG. 10: PRINCIPLE ELEMENT

| Atom | Description | Required |
|---|---|---|
| PRINCIPLE_TITLE | Identifies the principle element as: Note, Tip, Caution or Important | YES |
| PRINCIPLE_PARAGRAPH | Identifies additional information, alerts and advice | YES |
| GRAPHICS | Linked pictures or other graphical elements illustrating the critical attributes of the principle | NO |

FIG. 11: PROCEDURE ELEMENT

| Atom | Description | Required |
|---|---|---|
| PROCEDURE_TITLE | Identifies the procedure by describing the desired outcome | YES |
| PROCEDURE_INTRO | Identifies the definition of the procedure and a reason to perform the procedure – ends in a colon | YES |
| PROCEDURE_STEP | Identifies steps taken to perform the procedure | YES |
| PROCEDURE_SUBSTEP | Identifies steps taken to perform a secondary procedure nested within the main procedure | NO |
| PROCEDURE_PARAGRAPH | Describes the result of the procedure | NO |
| CODE | Identifies data to enter, such as a command | NO |
| PRINCIPLE | Short, important hints on what should or should not be done | NO |
| GRAPHICS | Linked pictures or other graphical elements illustrating the critical attributes of the principle | NO |

FIG. 12: RELATED TOPIC ELEMENT

| Atom | Description | Required |
|---|---|---|
| RELATED_TOPIC | Identifies the title of the section | YES |
| RELATED_TOPIC_LIST | Identifies the list of names relating to the topic | YES |

FIG. 13: PROCESS ELEMENT

| Atom | Description | Required |
|---|---|---|
| PROCESS_TITLE | Identifies the process | YES |
| PROCESS_PARAGRAPH | Identifies the flow of the process | YES |
| PROCESS_STEP | Identifies the steps taken to perform the process | NO |
| STEP_PARAGRAPH | Describes what happens during a particular step – a STEP_PARAGRAPHS may be used for each step listed | NO |
| PRINCIPLE | Short, important hints on what should or should not be done | NO |
| GRAPHICS | Linked pictures or other graphical elements illustrating the critical attributes of the process | NO |

FIG. 14: STRUCTURE ELEMENT

| Atom | Description | Required |
|---|---|---|
| STRUCTURE_TITLE | Identifies the structure | YES |
| STRUCTURE_DESCRIPTION | Describes the function or use of the structure | YES |
| ITEM | Identifies a part or component of the structure | NO |
| PRINCIPLE | Short, important hints on what should or should not be done | NO |
| GRAPHICS | Linked pictures or other graphical elements illustrating the critical attributes of the concept | NO |

FIG. 15: TRANSITION ELEMENT (For Printed Output Only)

| Atom | Description | Required |
|---|---|---|
| TRANSITION_PARAGRAPH | A sentence or two that enhance the flow between two or more elements | YES |
| PRINCIPLE | Short, important hints on what should or should not be done | NO |
| GRAPHICS | Linked pictures or other graphical elements illustrating the critical attributes of the process | NO |

SYSTEM AND METHOD FOR INFORMATION ENCAPSULATION FOR PROVIDING MULTIPLE DELIVERABLE FORMATS FROM ONE INFORMATION SOURCE

BACKGROUND

1. Field

The present disclosure relates to content management and documentation systems. Specifically, the present disclosure provides a system and method of information encapsulation as a means for creating documentation in a variety of deliverable formats from one information source.

2. Description of the Related Art

Technical writers are required to prepare documentation of software and computer hardware in multiple deliverable formats. These deliverable formats generally range from web-accessible pages to printed and bound manuals with a host of formats in between. Each deliverable format has stylistic issues and limitations in general that must be considered during preparation. For example, webpages lack the text formatting and placement options available to printed manuals; however, webpages allow individual user customization to meet a particular reader's needs through supplied Cascading Style Sheets (CSS). Additionally, webpages can be combined with a search engine to provide a more thorough search of the documentation than is possible with printed manuals. On the other hand, printed manuals provide the technical writer with better control over the overall presentation of the information, i.e., there are no font or color inconsistencies as is prevalent in web-based documentation. However, whereas webpages can be thoroughly searched, printed manuals provide only a Table of Contents and an index to assist a reader in finding an answer to a question.

The difference in search implementation between webpages and printed manuals, alone, require substantial changes in the way each document is created by the writer. Often, each document type will need to be rewritten nearly from scratch, thus severely increasing the time and/or manpower required to produce the necessary documentation. Further, having different writers preparing each individual document format quickly leads to inconsistencies in style, tone and even readability, collectively termed herein as writing style, between the various formats.

Various prior art techniques have been employed to try to prevent writing style issues from occurring within a set of documentation. One such technique that has gained widespread acceptance is the technique of Information Mapping. Information Mapping replaces paragraphs with so-called information blocks made up of one or more sentences, which clearly relate to a specific and limited topic. These information blocks may then be mapped, or linked, in a variety of ways to produce documents that meet a range of presentation needs. Additionally, the structure of each information block is compact and rather rigidly defined, thus discouraging non-essential stylistic language which may cause readability issues when producing documents of varying presentation requirements. While this technique greatly reduces writing style differences between documentation formats, it still requires that each document type be written separately; however, some time savings is achievable since much of the information written in this manner may be imported into each of the various deliverable formats.

Therefore, the industry is in need of techniques for writing documentation once and deploying it in multiple deliverable formats in an automated or nearly automated process, thus eliminating a significant amount of workload associated with producing multiple deliverable formats individually.

SUMMARY

The present disclosure provides a system and method of information encapsulation for providing information in multiple deliverable formats from a single information source. The present method of information encapsulation is a technique for writing that concentrates on identifying information types, called descriptor elements. Each descriptor element is a group of information that is so closely related that the individual pieces from which it is fabricated would not make sense separately, such as a single procedure (all the steps in creating a new file), a concept (an explanation of descriptor elements), and so on. This approach builds on the information mapping method, but significantly increases the specificity required by the writer to reinforce the discrete nature of information at a more basic level.

This technique supports information reuse across multiple deliverable formats and design structures. By creating a consistent structure for the various information types, large numbers of writers can easily collaborate on projects with multiple outputs sharing content without severe conflict in writing style.

An object of the present invention is to provide a method of information encapsulation providing at least one deliverable format from a single information source The method provides for separating data into at least one block and associating at least one descriptor element with the at least one block. The descriptor element provides a general description for the block of data. The method also provides for associating at least one descriptor atom, selected from a list of descriptor atoms corresponding to the descriptor element, with at least one individual component data of the block. The descriptor atom provides a specific description of the individual data component within the block.

Additionally, the block and the associated descriptor element and atom are stored in a data storage device. An output selection means is provided and configured for allowing the selection of at least one deliverable format by a user. Finally, the stored data and associated descriptor elements and atoms are processed to produce the user-selected deliverable format.

BRIEF DESCRIPTION

These and other features, aspects, and advantages of the present disclosure will become better understood with regard to the following description, appended claims, and accompanying drawings wherein:

DETAILED DESCRIPTION

Figure 1:
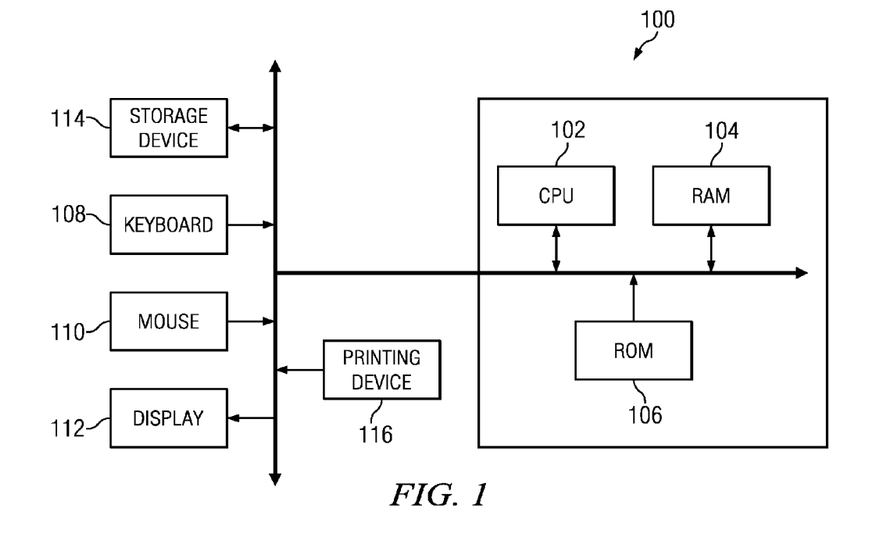
FIG. 1 is a block diagram of an exemplary system for information encapsulation in accordance with the present disclosure.

It is to be understood that the present disclosure may be implemented in various forms including: hardware, software, firmware, special purpose processors and any combination thereof. In one embodiment, the present disclosure may be implemented as application software or a suite of application software tangibly embodied on a non-transitory program data storage device or non-transitory program storage device. The application software may be executable by a machine having any suitable architecture such as that shown in FIG. 1. Preferably, the machine 100 is implemented on a computer platform having one or more processors (CPU) 102, volatile memory (RAM) 104, non-volatile, read-only memory (ROM) 106 and input/output devices such as keyboard 108, cursor control device (e.g., a mouse) 110 and a display device 112. The computer platform also includes an operating system and micro-instruction code. The various processes and functions described herein may be part of either the micro-instruction code or the application software (or a combination thereof), which is executed by the operating system. In addition, other peripheral devices may be present and connected to the computer platform such as a non-transitory data storage device 114, a printing device 116, etc.

It is to be further understood that some of the constituent system components and method steps depicted in the accompanying figures may be implemented in software and therefore, the actual connections between system components may differ from those depicted. Given the teachings of the present disclosure presented herein, one of ordinary skill in the related art will be able to contemplate these and similar implementations or configurations of the present disclosure.

Figure 2:
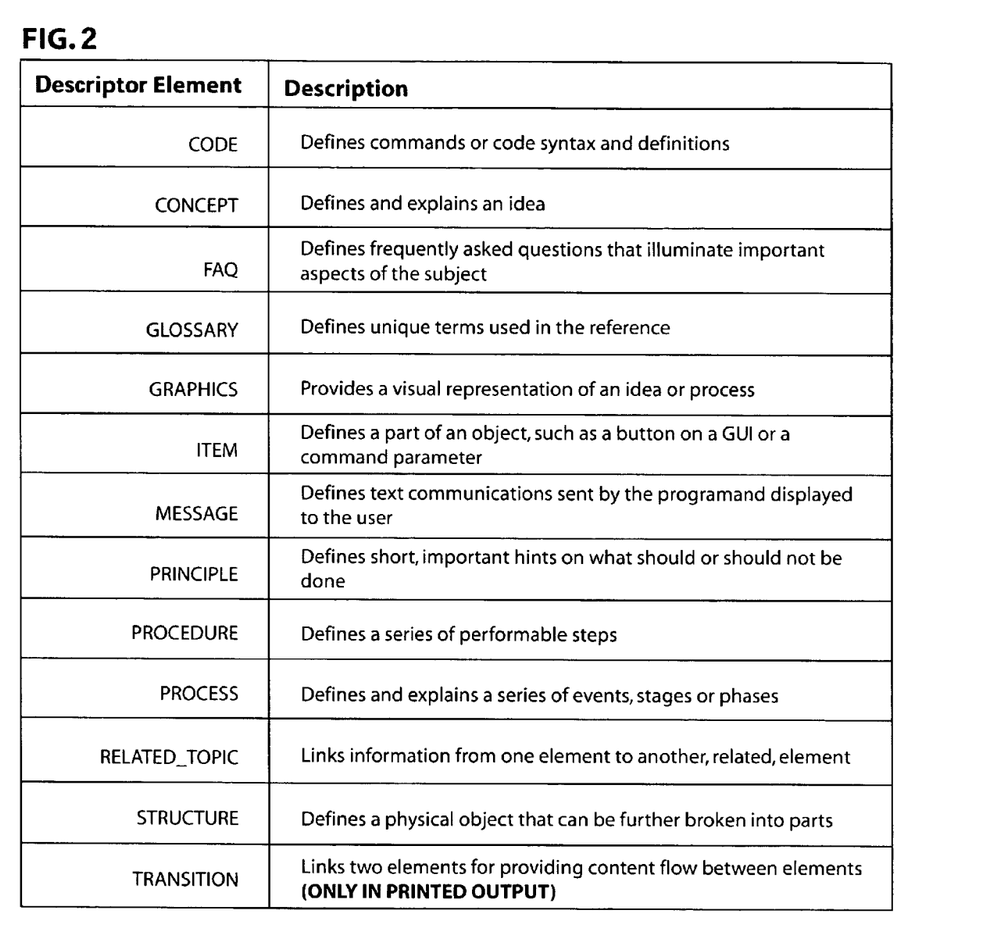
FIG. 2 is a table of basic descriptor element types employed in an embodiment of the present disclosure.

A system and method of information encapsulation for providing information in multiple deliverable formats from a single information source are provided. The present disclosure provides a method wherein descriptor elements, such as those listed in FIG. 2, are used to classify information into groups. Each information piece of a particular element group is further characterized using related sub-classifications, or atoms. For example, in a programming reference manual, there would most likely be groupings of information that can be characterized by the Code element. The information contained within this Code element may be further broken down as the Command Name, Command Syntax, Item Element, Command Parameter List, Command Paragraph, etc. as listed in FIG. 3.

To illustrate this point, consider how to present the C++ programming language implementation of the Class object to a reader. The encapsulated information technique in accordance with the present disclosure would produce an information group, using the CODE descriptor element, that may look like this:

```
{CODE}
    {NAME}CLASS{!NAME}
    {SYNTAX}
        CLASS Object_Name {
            int Var1;
            int Var2;
            void FunctA( );
            void FunctB( );
        };
    {!SYNTAX}
    {ITEM}
        {ITEM_TITLE}CLASS Object{!ITEM_TITLE}
        {ITEM_DESCRIPT}Declaring a
        CLASS object{!ITEM_DESCRIPT}
    {!ITEM}
    {PARAGRAPH}
        The class declaration consists of the keyword class,
        followed by the name of the object, a pair of braces, and
        a semi-colon. Within the braces variables and member
        functions are defined.
    {!PARAGRAPH}
    {!ITEM}
{!CODE}
```

The information related to the Class object is broken down and characterized with the atoms: Name, Syntax and Item. Additional information can be added utilizing the other atoms associated with the CODE element. Further, some atoms may be used more than once within a specific information grouping. For example, additional ITEM atoms may be included within the CODE element to further define and explain the Class object.

In a similar manner, the other descriptor element types illustrated in FIG. 2 can be implemented and combined to produce a complete manual, e.g., in the case of the above example, on the C++ programming language. The basic set of descriptor elements as described in the present embodiment is: CODE, CONCEPT, FAQ, GLOSSARY, GRAPHICS, ITEM, MESSAGE, PRINCIPLE, PROCEDURE, RELATED TOPIC, STRUCTURE and TRANSITION. As shown in FIGS. 3-15, some atoms are required by a particular element while others are optional. Each descriptor element and its associated atoms will be discussed in greater detail below.

Figure 3:
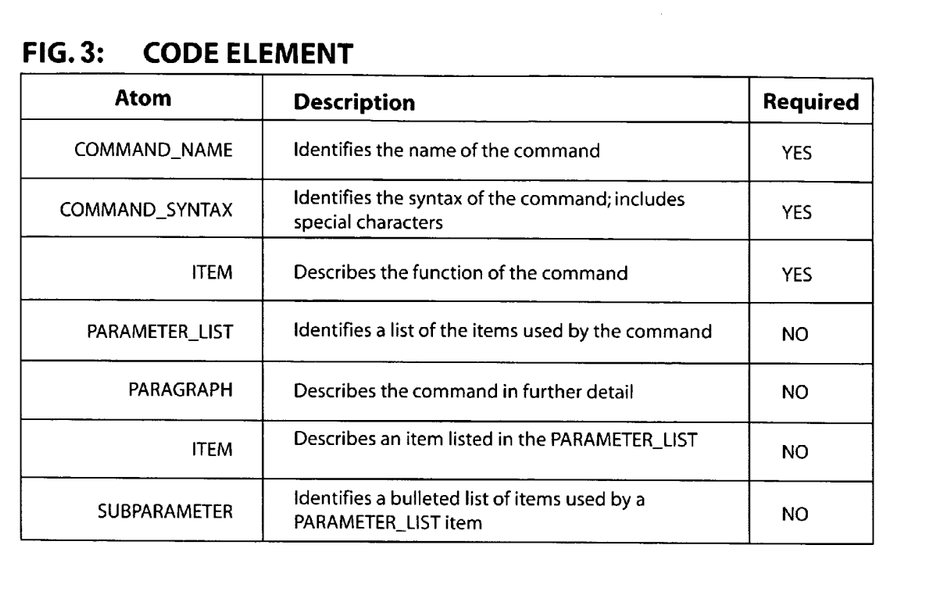
FIG. 3 is a table of representative atoms (attributes) for the Code element in accordance with the present disclosure.

Referring to FIG. 3, the CODE element contains the following atoms: COMMAND_NAME, COMMAND_SYNTAX, ITEM element, PARAMETER_LIST, PARAGRAPH, ITEM element and SUBPARAMETER. The CODE element requires that COMMAND_NAME, COMMAND_SYNTAX and ITEM element be present in order to be properly defined. The remaining atoms are optional and depend on the individual application. COMMAND_NAME provides the name of the command being encapsulated by the CODE element. COMMAND_SYNTAX defines the proper syntactical structure of the command. As the previous example for encapsulating the C++CLASS object in accordance with the present disclosure illustrates, the COMMAND_SYNTAX atom can contain a template or example of the command and its parameters. The CODE element contains two ITEM elements, the first being required while the second is optional. The required ITEM element provides a brief description of the function or purpose of the command within the structure of the ITEM element as described later.

Of the optional atoms employed by the CODE element, the PARAMETER_LIST provides identification of the various parameters and/or modifiers used by the command. These parameters and/or modifiers can be further discussed using the optional ITEM element—a unique ITEM element for each of the parameters and/or modifiers in the list. The PARAGRAPH atom, as its name implies, identifies the descriptive paragraph, describing the command in further detail. Finally, the SUBPARAMETER can be used when parameters and/or modifiers in the PARAMETER_LIST have themselves parameters and modifiers (referred to as sub parameters); in such a case, a SUBPARAMETER atom would be used to list the sub parameters of the particular parameter or modifier.

Figure 4:
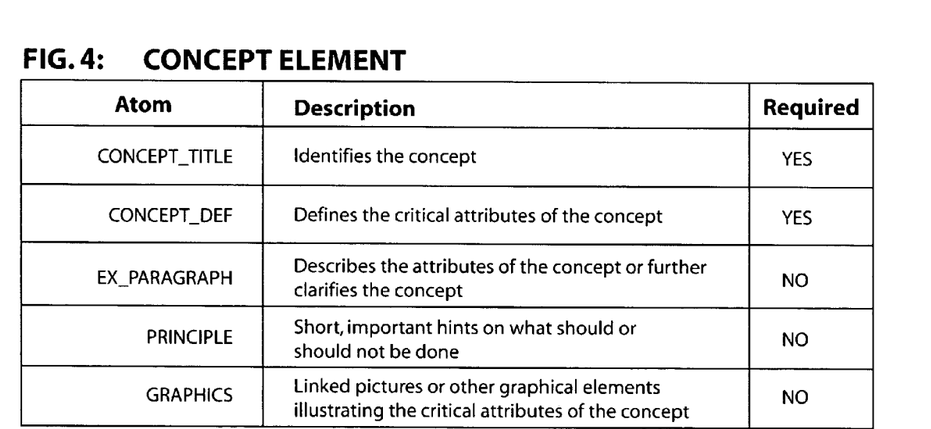
FIG. 4 is a table of representative atoms (attributes) for the Concept element in accordance with the present disclosure.

The CONCEPT element, as shown in FIG. 4, includes the following atoms: CONCEPT_TITLE, CONCEPT_DEF, EX_PARAGRAPH, PRINCIPLE element and GRAPHICS element. Only CONCEPT_TITLE and CONCEPT_DEF are required by the CONCEPT element. CONCEPT_TITLE provides the identifying title for the concept, while CONCEPT_DEF provides a brief description or definition of the concept. The optional EX_PARAGRAPH provides a more thorough discussion of and further clarifies the concept, possibly with examples. The PRINCIPLE element describes, briefly, when the concept is appropriately used and when it is not. The GRAPHICS element provides a graphical representation of the concept, if appropriate, to illustrate some point with respect to the concept.

Figure 5:
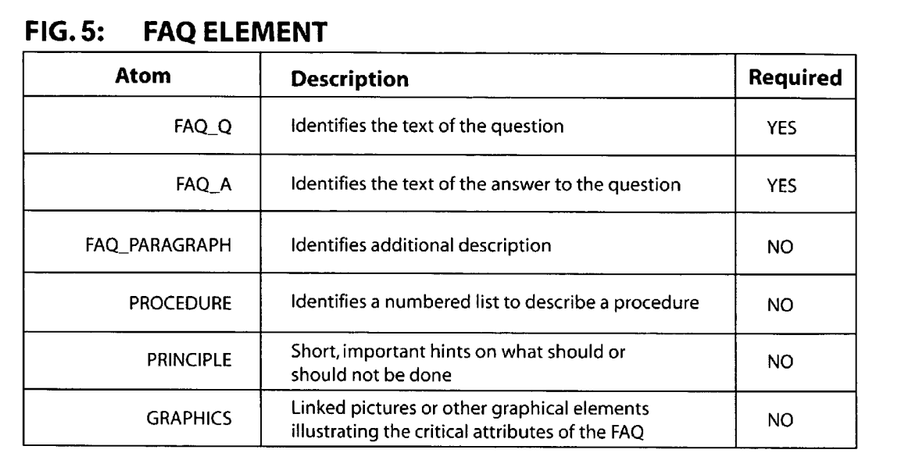
FIG. 5 is a table of representative atoms (attributes) for the FAQ element in accordance with the present disclosure.

The FAQ, or Frequently Asked Question, element of FIG. 5 provides quick answers to common questions and problems. The two required atoms, FAQ_Q and FAQ_A, identify the text of a question and its solution, respectively. The FAQ element also includes several optional atoms—FAQ_PARAGRAPH for providing more detailed information, PROCEDURE element for providing, where applicable, a list of steps to perform as a solution to the question, PRINCIPLE element for describing, briefly, when the FAQ solution is appropriately used and when it is not and the GRAPHICS element for providing a graphical representation of the question and or solution if appropriate.

Figure 6:
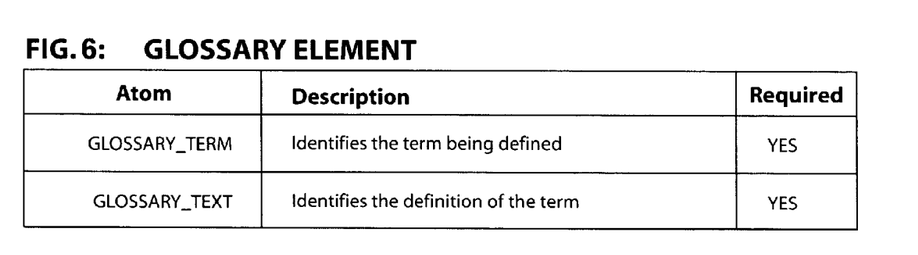
FIG. 6 is a table of representative atoms (attributes) for the Glossary element in accordance with the present disclosure.

Referring to FIG. 6, the GLOSSARY element has two atoms, both of which are required. GLOSSARY_TERM identifies the term to be included and defined within a glossary. The GLOSSARY_TEXT defines the term.

Figure 7:
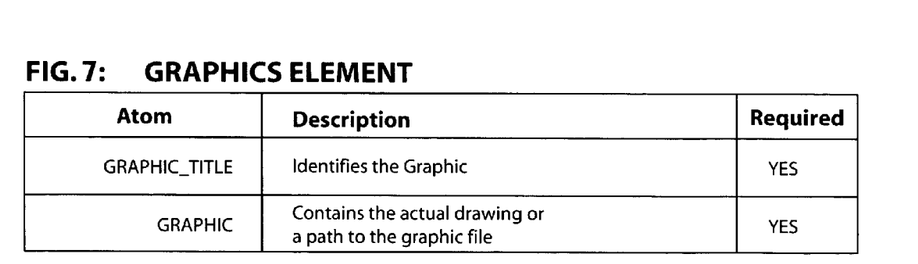
FIG. 7 is a table of representative atoms (attributes) for the Graphics element in accordance with the present disclosure.

The GRAPHICS element of FIG. 7 allows the use of illustrations to enhance the readability of a manual. The element requires two atoms. The first, GRAPHIC_TITLE, identifies the graphic by providing text that can be formatted within the final document as a caption for the graphic. The GRAPHIC atom can contain either the actual graphic or a link or path to the graphic file.

Figure 8:
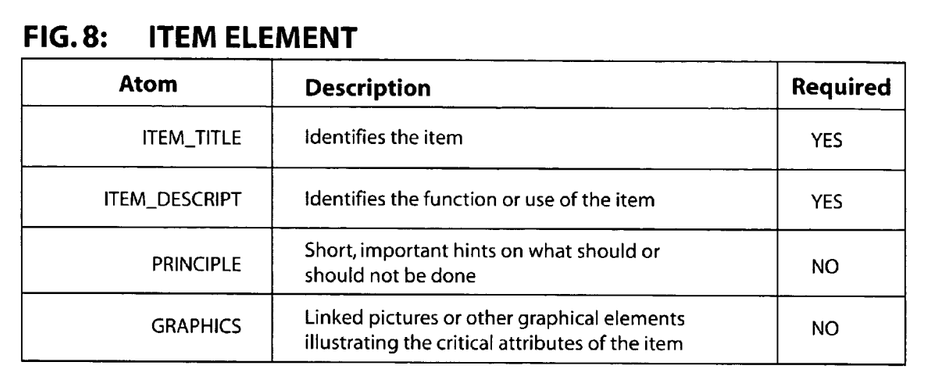
FIG. 8 is a table of representative atoms (attributes) for the Item element in accordance with the present disclosure.

FIG. 8 lists the atoms associated with the ITEM element. ITEM_TITLE identifies the item while ITEM_DESCRIPT provides a description of the function or purpose of the item. Both ITEM_TITLE and ITEM_DESCRIPT are required by the ITEM element. Additionally, two optional atoms, the PRINCIPLE element for describing, briefly, when the item is appropriately used and when it is not, and the GRAPHICS element for providing a graphical representation of the item, if appropriate, are associated with the ITEM element.

Figure 9:
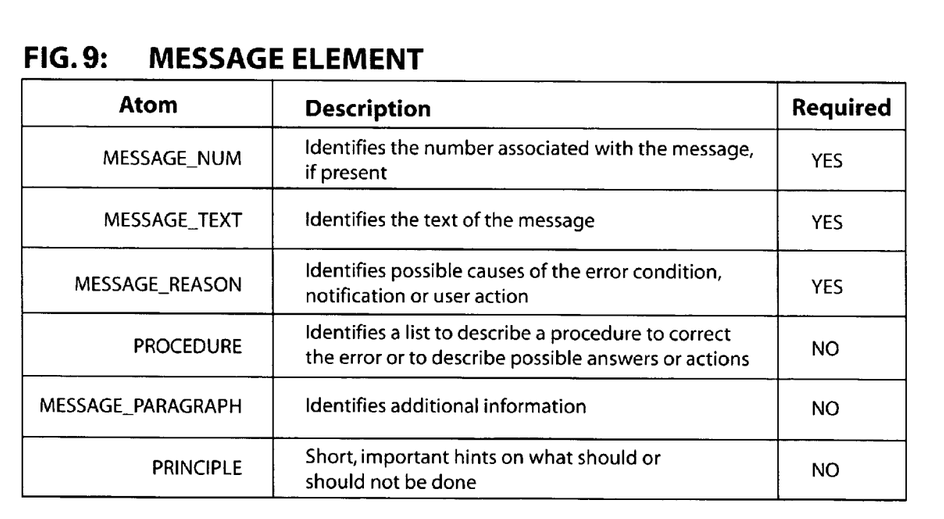
FIG. 9 is a table of representative atoms (attributes) for the Message element in accordance with the present disclosure.

The MESSAGE element in FIG. 9 contains three required atoms—MESSAGE_NUM, MESSAGE_TEXT and MESSAGE_REASON—and three optional atoms—PROCEDURE element, MESSAGE_PARAGRAPH and PRINCIPLE element. MESSAGE_NUM contains a unique identifying number of the message. The MESSAGE_TEXT provides the text of a message displayed to a user, such as an error message or status message. MESSAGE_REASON contains information regarding the reason the message is displayed, e.g., cause of an error condition, notification or user action. In the case of an error message, the PROCEDURE element can provide the step-by-step instructions necessary to correct the error. The MESSAGE_PARAGRAPH provides additional supporting information and the PRINCIPLE element describes, briefly, what should or should not be done.

Figure 10:
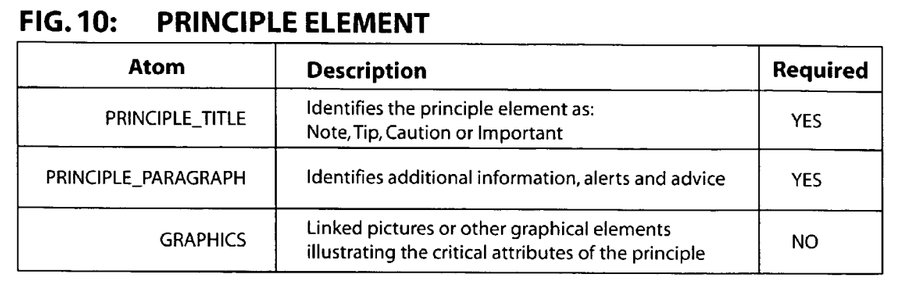
FIG. 10 is a table of representative atoms (attributes) for the Principle element in accordance with the present disclosure.

The PRINCIPLE element of FIG. 10 is often associated with other elements as mentioned previously. The required PRINCIPLE_TITLE atom identifies the type of principle contained in the element, e.g., Note, Tip, Caution, Important, etc. The PRINCIPLE_PARAGRAPH, also a required atom, contains the information, alert or advice text. Optionally, a GRAPHICS element may also be included providing graphics to better convey the principle discussed.

Figure 11:
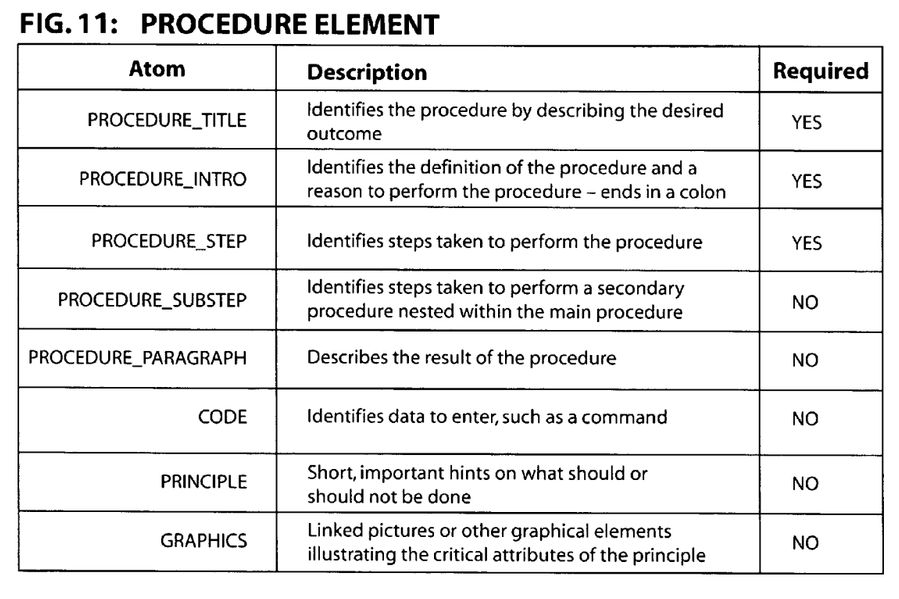
FIG. 11 is a table of representative atoms (attributes) for the Procedure element in accordance with the present disclosure.

FIG. 11 lists the eight atoms associated with the PROCEDURE element. PROCEDURE_TITLE identifies the procedure, preferably by describing the desired outcome. The PROCEDURE_INTRO provides a definition of and a reason for performing the procedure. PROCEDURE_STEP contains a step necessary to perform the procedure. Multiple PROCEDURE_STEP atoms may be present, one for each step to be performed in the procedure. Some of the steps may themselves have component steps, thus a PROCEDURE_SUBSTEP may optionally be included in the PROCEDURE element for each of these component steps. PROCEDURE_PARAGRAPH, another optional atom, contains a description of the results and possibly information about common problems arising during the procedure. A CODE element may also be present, containing the data or commands to be entered during execution of the procedure. The PRINCIPLE element describes, briefly, when the procedure is appropriately used and when it is not and the GRAPHICS element provides a graphical representation of the procedure if appropriate.

Figure 12:
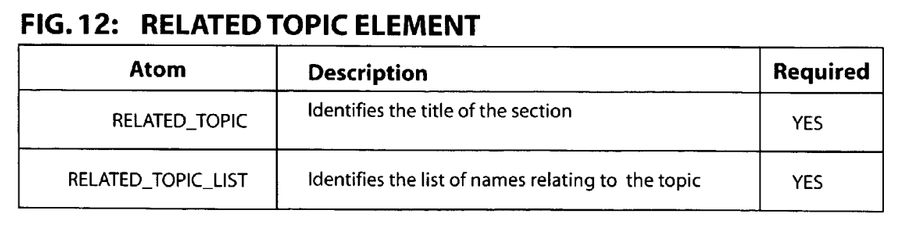
FIG. 12 is a table of representative atoms (attributes) for the Related Topics element in accordance with the present disclosure.

The RELATED TOPIC element of FIG. 12 contains only two atoms, both of which are required. The first, RELATED_TOPIC contains the section title or topic category, while the second, RELATED_TOPIC_LIST, contains a list of names and/or references related to the topic.

Figure 13:
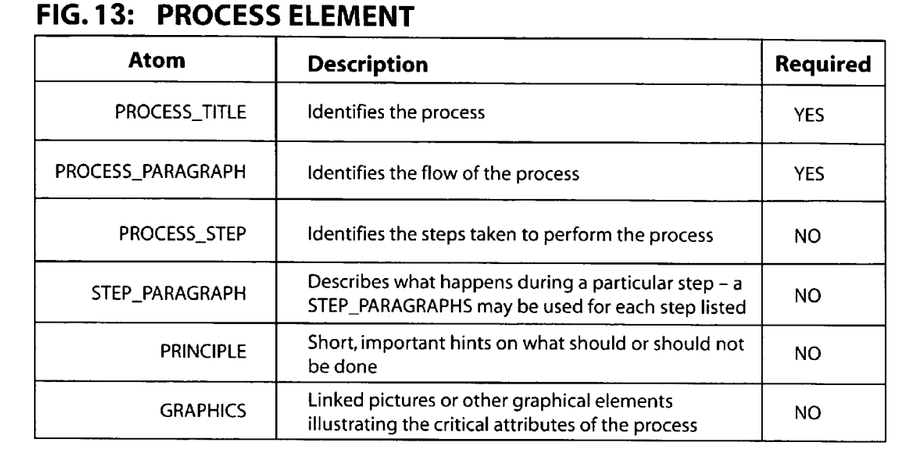
FIG. 13 is a table of representative atoms (attributes) for the Process element in accordance with the present disclosure.

The PROCESS element, as shown in FIG. 13, includes six atoms: PROCESS_TITLE, PROCESS_PARAGRAPH, PROCESS_STEP, STEP_PARAGRAPH, PRINCIPLE element and GRAPHICS element. PROCESS_TITLE identifies the process while PROCESS_PARAGRAPH details the process's function, purpose, etc.; both atoms are required by this element. PROCESS_STEP identifies a step performed by the process—multiple PROCESS_STEP atoms may be present—while STEP_PARAGRAPH provides a description of the step. The PRINCIPLE element describes, briefly, when the process is appropriately used and when it is not and the GRAPHICS element provides a graphical representation of the process.

Figure 14:
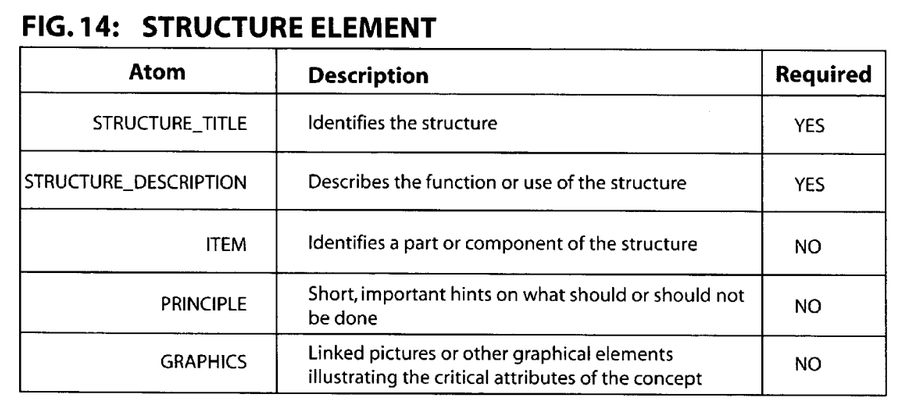
FIG. 14 is a table of representative atoms (attributes) for the Structure element in accordance with the present disclosure.

FIG. 14 lists the atoms present in the STRUCTURE element. The required atoms, STRUCTURE_TITLE and STRUCTURE_DESCRIPTION, identify the structure and describe the structure, respectively. The ITEM element is used to list the component parts of the structure—one ITEM element for each part, while the PRINCIPLE element describes, when the structure is appropriately used, how it is used, etc. and the GRAPHICS element provides a graphical representation of the structure.

Figure 15:
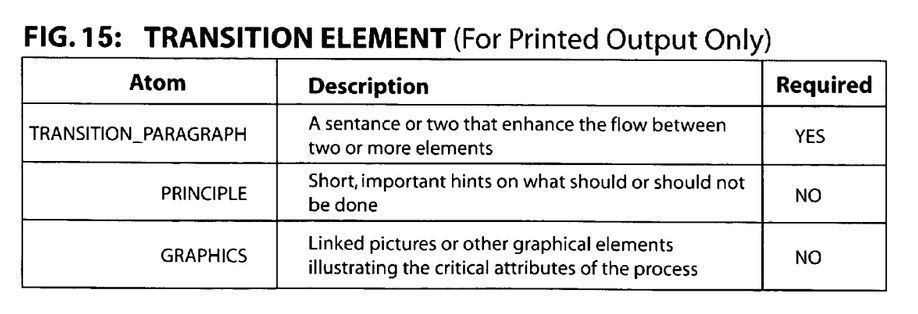
FIG. 15 is a table of representative atoms (attributes) for the Transition element in accordance with the present disclosure.

The TRANSITION element of FIG. 15 provides smooth flow between elements using text contained within the TRANSITION_PARAGRAPH. The optional PRINCIPLE element describing, when the transition is appropriately used and the GRAPHICS element providing a graphic or illustration, may also be used. The TRANSITION element, however is mostly reserved for printed manuals to enhance readability; electronic documentation most often is read simply to find a specific answer, as well as its highly searchable nature, make readability and flow from one section to the next not a great concern to either the writer or the reader.

FIGS. 2-15 provide only a limited list of descriptor elements and atoms for illustrating the application of the method in accordance with the present disclosure, however, individual users may wish to expand this list or create entirely new sets of customized elements and atoms to suit specific needs.

The encapsulated information can be contained within an information database wherein each piece of information is assigned to a descriptor element and atom or each element may be a separate text file containing all the atoms within. In either case, a processor is configured to gather the individual descriptor elements, arrange them in the proper sequence and finally, output the desired document type. The processor will preferably take the form of a software package that requires minimal user interaction to perform these tasks.

Figure 16:
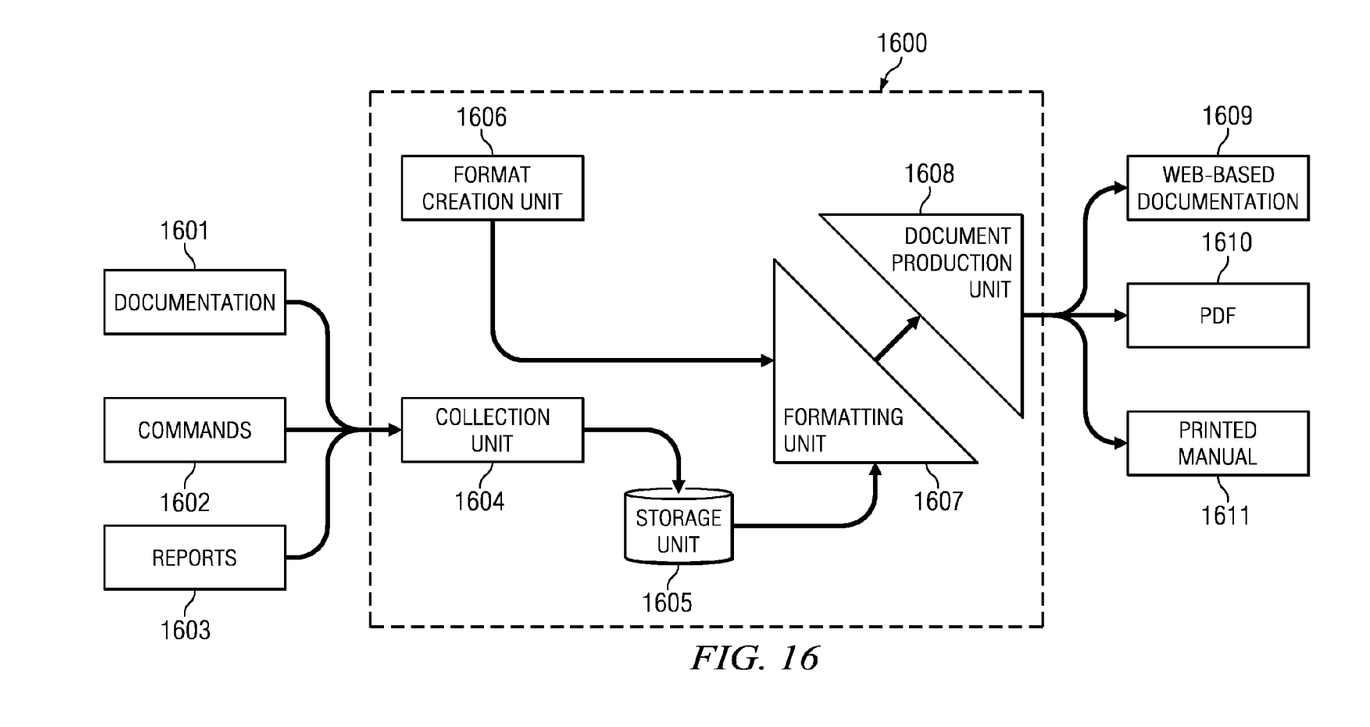
FIG. 16 is a schematic overview of an embodiment of a system employing a method of the present disclosure.

FIG. 16 shows an embodiment of the present disclosure implemented as a complete system 1600 for implementing the information encapsulation method as described previously herein. The system 1600 is preferably accessible across a corporate or departmental network by all technical writers simultaneously providing a standardized environment suitable for team oriented documentation projects, wherein a team of multiple writers are tasked with producing a single document in one or more publication formats, i.e. Printed/bound, PDF, Web-based, proprietary help files, etc. The system 1600 is equipped with a collection unit 1604, an information storage unit 1605, a format creation unit 1606, a formatting unit 1607 and a document production unit 1608. The various components of the system 1600 may be positioned within a single server, multiple servers, server/workstation setups, etc.

The collection unit 1604 collects information from disparate information sources, such as developer notes and documentation 1601, beta tester and/or user comments and questions 1602, bug reports 1603, etc., and performs any necessary encapsulation of the information. However, the encapsulation may also be implemented within the various submission methods (not shown) for the information sources 1601, 1602 and 1603. For example, a web based bug reporting system may provide the submitter with a form for entering the information within predefined fields thus forcing the encapsulation of the information at the earliest stage of the document development process. Alternatively, a writer may transcribe the information contained within the information sources 1601, 1602, and 1603 into an encapsulated format utilizing an interface appropriately configured for the task. Such an interface may include a workstation or terminal connected to the other system components via a standard network connection and additionally having a display, a keyboard and a mouse. The interface would preferably be a software implementation providing the writer with an efficient means of entering information in an encapsulated form with the appropriate element and atom descriptors.

As each encapsulated information piece is collected by the collection unit 1604, it is relayed to and stored in the information storage unit 1605. The information storage unit 1605 is preferably non-volatile, so that the stored information is not lost when the system looses power for whatever reason. A preferred information storage unit is a collection of hard drives configured as a RAID (Redundant Array of Independent Disks) providing data loss prevention from hard drive malfunctions, as well as non-volatile storage.

The format creation unit 1606 allows the writer to create formatting styles for the various descriptor elements and atoms. Each individual formatting style can be associated with a particular output document type, multiple document types or common to all the document types as preferred by the writer. The format creation unit is preferably implemented as an application software component executed either on a workstation or on a server.

The formatting unit 1607 retrieves the stored information from the information storage unit 1605 and the formatting styles appropriate for the output document types selected by the writer. The function of the formatting unit 1607 is to apply the formatting in the format styles to the encapsulated information and subsequently, produce a project file which is transferred to the document production unit 1608 where the project file is converted into the desired output document type, e.g. Web-based documentation pages 1609, PDF document 1610, printed manual 1611 or other appropriate document types. In the case of the printed manual, the document production unit additionally includes a printer or press for producing the manual.

As previously mentioned, the system 1600 may be implemented in a server/workstation configuration. This implementation would preferably have the information storage unit 1605, the formatting unit 1607 and some or all components of the document production unit 1608 located in a centrally accessible server; the printer or press, if present, may be connected directly to the server via parallel, serial, or other such standard cable or indirectly via a network connection. The remaining components—the collection unit 1604 and format creation unit 1606 may be either software located on the server and executable over a network, or software residing on a workstation connected to the server via a network system.

An embodiment of the present disclosure provides a software-based means for easily creating, defining and modifying a unique set of descriptor elements and atoms. Additionally, the present embodiment provides a method for producing rules for combining the information encapsulated in the manner according to the present disclosure to form various document output formats such as: PDF, MS Word document, html, JavaHelp, Windows Help, etc. The present embodiment, can be either a single software application or an application suite wherein the suite components individually provide functionality for creating and editing descriptor element sets, defining output document rules and inputting, storing characterized information and formatting the stored information in a manner specified by the output document rules to produce the desired output document format.

Figure 17:
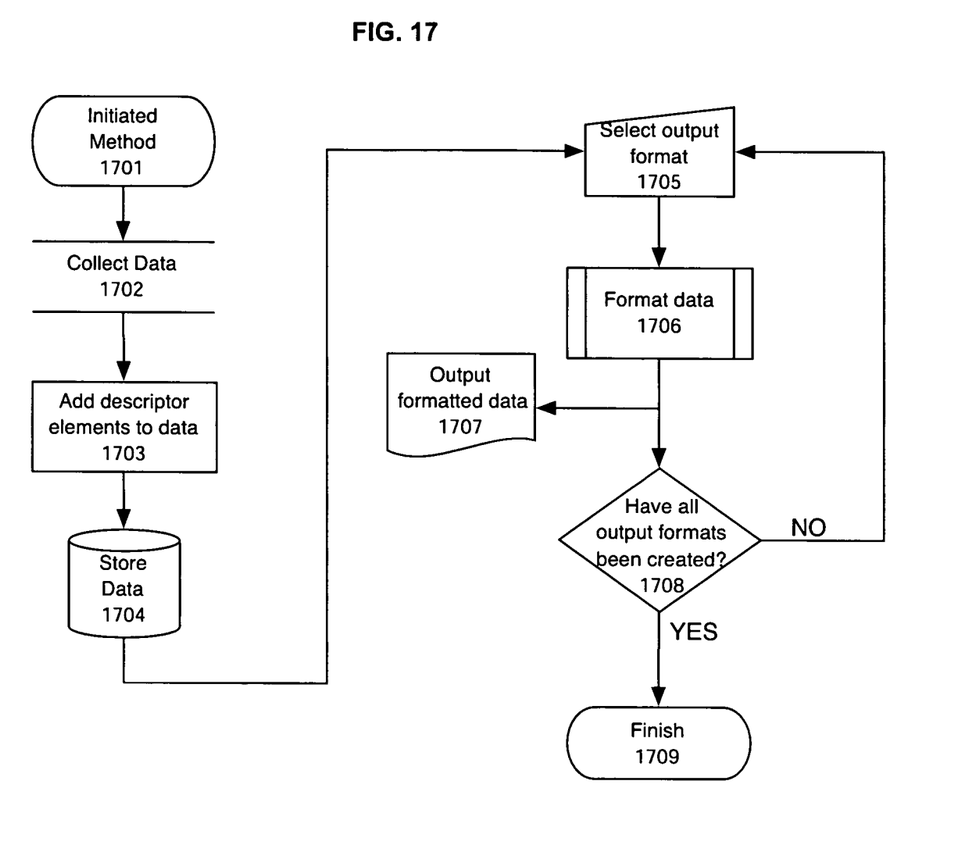
FIG. 17 is a flow chart of the steps employed in an embodiment of the present disclosure.

FIG. 17 illustrates the steps that are performed by a software application embodiment as outlined above. Step 1701 initiates the process by launching the appropriate software package. Data related to the information to be presented is collected—research is performed if necessary—in step 1702.

Elaborating on Step 1702, a team leader identifies a development team for whose product the documentation is written, as well as a documentation team tasked with the development of documentation in a final deliverable form. Each member of the documentation team—outside the writing department—can provide information from delivery dates to user issues. Developing a good relationship with the team members increases the chances of being alerted to problems and changes in schedules before they occur and thus leads to a successfully produced deliverable.

Using the disclosed writing method in a team requires that responsibilities be clearly identified and assigned to prevent overlap and redundancy. For example, content developers should identify which elements they will work on, and which will be written by another writer or reused from the database.

In addition, each team member must become familiar with and understand how their pieces fit into the "big picture." For this, an outline of the deliverable and role identification become essential for keeping everyone on track and preventing written elements from becoming either too focused or too fuzzy.

Generally, the documentation team will include: a lead writer, one or more information developers, an information designer, database administrator, an editor, a graphic artist and an indexer. Other personnel may be added to the team as circumstances warrant.

The lead writer coordinates the efforts of all the writers assigned to a particular project, making decisions related to design, deliverables, project priorities, and standards. The lead writer's responsibilities include: acting as the main contact for status of the project, setting the scope of the project by setting milestones, determining the resource needs, and assigning responsibilities and roles to the writers on the team, making a final decision, based on team input, as to format, form, flow, design, and tone, ensuring that user concerns are considered and met by the deliverable, maintaining a record of the writing effort, including contacts, dates, key decisions, file lists, and so on, archiving this information for future project maintenance, and working with the development team to ensure the correct placement of files on the distribution media (CD, tape, web, and so on) and that all files are included on the final master.

The information developers provide the majority of the content for a product. Each developer knows a good deal about the product being documented, and often installs and works with the product. The information developers' responsibilities include: reviewing and resolving support issues for information elements, researching and reporting on both the product and audience requirements, and creating and maintaining information elements for the product.

The database administrator assists writers in using content management tools and databases. The database administrator provides maintenance and any troubleshooting that may be necessary during use of the content management tools and databases.

The editor ensures that documentation is conceptually complete, well organized, accurately reflects the product being documented, and adheres to the team's writing standards. In addition, the editor might also be asked to ensure that information element requirements are being met.

The graphic artist develops and provides graphics for the project, while the indexer creates and maintains the keywords, metatags, and index entries for the project.

An additional component of step 1702 is the creation of one or more user profiles. User profiles provide a model of the target audience for which the deliverable is produced. A proper user profile takes into consideration the user's job-type, experience level and relevant technical knowledge level (e.g., domain knowledge); accessibility issues, e.g. visually impaired, motility impaired, etc., should also be considered. User profiles provide the basis for the various output formats of the deliverable. The user profiles should be tested through customer focus groups, marketing interviews, technical support interviews, etc. to evaluate its effectiveness at categorizing and modeling the intended audience of the deliverable.

Step 1702, further includes the process of identifying information sources, such as the product's graphical user interface (GUI), development team interviews, pre-existing documentation, marketing documentation/brochures/interviews, design specifications and white papers, customer support databases and interviews, and competitor documentation.

The product's GUI should be reviewed for product focus as well as for interface organization. All interface components should be defined and their function explained in the documentation.

Proceeding to step 1703, a user assigns the appropriate descriptor elements and atoms to the collected data, followed by storing the characterized data in step 1704. A component of step 1703 is the attachment of metatags to the descriptor elements. These metatags describe each descriptor element and its attached data. The metatags may categorize the descriptor element by user type, information type, deliverable format, version, platform, product, etc. and aid in retrieval of the appropriate elements from the data storage/content management system when constructing the specified deliverable as described below in step 1706. Additional metatags may be created and used as dictated by the needs of specific projects.

Once all the data has been characterized and stored (in step 1704), the user selects the desired output format for the information from a list of supported formats in step 1705. Step 1706 provides a processor to convert and reformat the stored data based on rules associated with the selected output format. The final document is produced in step 1707, however, if multiple output formats are desired, step 1708 provides a loop back to step 1705, allowing the user to select an additional output format. The steps 1705, 1706, 1707 and 1708 are performed until all desired output formats have been produced; at which point, step 1709 is performed, thus completing the process.

The rules used in step 1706 may be user-defined to meet individual document requirements. Such rules specify how each descriptor element and atom will be selected, handled and formatted by the processor in step 1706. For example, depending on an intended recipient, e.g., a new user, the rules may select descriptor elements having associated metatags with "new user" as the user type metatag. Furthermore, for example, the Command Name atom for a CODE information grouping may appear in bold in the main body of a printed manual while also appearing in the index section and in a keyword quick lookup section of the printed manual, thus providing fairly complete search options for the reader. Meanwhile, the Item atom of the same grouping would only appear in the main body. Similar rules would be applied to the remaining descriptors producing a complete printed manual. Individual rule sets can be created for all the supported deliverable formats, so that each format can have a unique look and the information can be optimized for the particular document type while the actual information is presented in a consistent writing style.

The described embodiments of the present disclosure are intended to be illustrative rather than restrictive, and are not intended to represent every embodiment of the present disclosure. Various modifications and variations can be made without departing from the spirit or scope of the disclosure as set forth in the following claims both literally and in equivalents recognized in law.

What is claimed is:

1. A method of information encapsulation for providing at least one deliverable format, the method comprising the steps of:

collecting data from a plurality of disparate information sources, each of the plurality of disparate information sources providing information associated with a single product;

separating the collected data into a plurality of blocks;

associating at least one descriptor element selected from a list of descriptor elements with each of the plurality of blocks, each descriptor element providing a general description for an associated block;

associating at least one descriptor atom, selected from a list of descriptor atoms corresponding to the at least one descriptor element, with at least one individual component data of each block, each descriptor atom providing a specific description of an associated data component;

receiving, for each of a plurality of deliverable formats, at least one formatting rule associated with a selected one of the plurality of deliverable formats, wherein the at least one formatting rule specifies at least one descriptor element associated with the at least one formatting rule;

storing the plurality of blocks the data components, the associated descriptor elements, and the associated descriptor atoms in a data storage device;

storing, for each of the plurality of deliverable formats, the at least one formatting rule associated with the selected one of the plurality of deliverable formats in the data storage device;

providing an output selection means for selection of the at least one deliverable format by a user;

receiving input from the user indicating the at least one deliverable format selected by the user;

selecting blocks associated with the descriptor element specified by a formatting rule associated with the at least one deliverable format selected by the user;

identifying, for at least one stored data component of each selected block, a format based on the descriptor atom associated with that stored data component and the formatting rule associated with the at least one deliverable format selected by the user;

formatting the selected data blocks and at least one stored data component of each selected block based on the identified formats; and generating an output document comprising the formatted data blocks and the formatted data components.

2. The method of claim 1, wherein at least one descriptor element is an atom of another descriptor element.

3. The method of claim 1, wherein the at least one descriptor element is selected from the group consisting of: Code, Concept, FAQ, Glossary, Graphics, Item, Message, Principle, Procedure, Process, Related Topics, Structure and Transition.

4. The method of claim 3, wherein the Code descriptor element comprises at least one of the following atoms: Command Name, Command Syntax, Item Element, Command Parameter List, Command Paragraph, and Command SubParameter.

5. The method of claim 3, wherein the Concept descriptor element comprises at least one of the following atoms: Concept Title, Concept Definition, Concept Example Paragraph, Principle Element, and Graphics Element.

6. The method of claim 3, wherein the FAQ descriptor element comprises at least one of the following atoms: FAQ Q, FAQ A, FAQ Paragraph, Procedure Element, Principle Element, and Graphics Element.

7. The method of claim 3, wherein the Glossary descriptor element comprises at least one of the following atoms: Glossary Term and Glossary Text.

8. The method of claim 3, wherein the Graphics descriptor element comprises at least one of the following atoms: Graphic Title and Graphic.

9. The method of claim 3, wherein the Item descriptor element comprises at least one of the following atoms: Item Title, Item Description, Principle Element and Graphics Element.

10. The method of claim 3, wherein the Message descriptor element comprises at least one of the following atoms: Message Number, Message Text, Message Reason, Procedure Element, Message Paragraph and Principle Element.

11. The method of claim 3, wherein the Principle descriptor element comprises at least one of the following atoms: Principle Title, Principle Paragraph and Graphics Element.

12. The method of claim 3, wherein the Procedure descriptor element comprises at least one of the following atoms: Procedure Title, Procedure Introduction, Procedure Step, Procedure Substep, Procedure Paragraph, Code Element, Principle Element, and Graphics Element.

13. The method of claim 3, wherein the Process descriptor element comprises at least one of the following atoms: Process Title, Process Paragraph, Process Step, Step Paragraph, Principle Element and Graphics Element.

14. The method of claim 3, wherein the Structure descriptor element comprises at least one of the following atoms: Structure Title, Structure Description, Item Element, Principle Element, and Graphics Element.

15. The method of claim 3, wherein the Related Topics descriptor element comprises at least one of the following atoms: Related Topic and Related Topic List.

16. The method of claim 3, wherein the Transition descriptor element comprises at least one of the following atoms: Transition Paragraph, Principle Element and Graphics Element.

17. The method of claim 1, wherein the steps of: storing, providing and processing are automated and configured to be performed with minimal user interaction by a processor.

18. The method of claim 1, wherein the method is integrated as part of a software application.

19. The method of claim 1, further comprising arranging the blocks in a sequence.

20. The method claim 1, wherein the at least one formatting rule specifies how the at least one descriptor element associated with the at least one formatting rule is selected.

21. A non-transitory data storage device comprising a set of computer readable instructions capable of being executed by at least one processor for performing a method of information encapsulation for providing at least one deliverable format, said method comprising the steps of:

collecting data from each of a plurality of disparate information sources, each of the plurality of disparate information sources providing information associated with a single product;

separating the collected data into a plurality of blocks;

associating at least one descriptor element selected from a list of descriptor elements with each of the plurality of blocks, each descriptor element providing a general description for an associated-block;

associating at least one descriptor atom, selected from a list of descriptor atoms corresponding to the at least on descriptor element, with at least one individual component data of each block, each descriptor atom providing a specific description of an associated data component;

receiving, for each of a plurality of deliverable formats, at least one formatting rule associated with a selected one of the plurality of deliverable formats, wherein the at least one formatting rule specifies at least one descriptor element associated with the at least one formatting rule;

storing the plurality of blocks the data components, the associated descriptor elements and the associated descriptor atoms in a data storage device; storing, for each of the plurality of deliverable formats, the at least one formatting rule associated with the selected one of the plurality of deliverable formats in the data storage device;

providing an output selection means for selection of at least one output document format by a user;

receiving input from the user indicating the at least one deliverable format selected by the user;

selecting blocks associated with at least one descriptor element specified by a formatting rule associated with the at least one deliverable format selected by the user;

identifying, for at least one stored data component of each selected block, a format based on the descriptor atom associated with that stored data component and the formatting rule associated with the at least one deliverable format selected by the user;

formatting the selected data blocks and at least one stored data component of each selected block based on the identified formats; and generating an output document comprising the formatted data blocks and the formatted data components.

22. The non-transitory data storage device of claim 21, further comprising the step of collecting data corresponding to information to be presented in the at least one deliverable format.

23. The non-transitory data storage device of claim 21 comprising a further computer readable instruction for arranging the blocks in a sequence.

24. The non-transitory data storage device of claim 21, wherein the at least one formatting rule specifies how the at least one descriptor element associated with the at least one formatting rule is selected.

25. A method for producing at least one deliverable from a plurality of information sources, the method comprising the steps of:

identifying a plurality of disparate information sources;

collecting data form the plurality of disparate information sources, each of the plurality of disparate information sources providing information associated with a single product;

separating data from the plurality of information sources into a plurality of blocks;

associating at least one descriptor element selected from a list of descriptor elements with each of the plurality of blocks, each descriptor element providing a general description for an associated block;

associating at least one descriptor atom, selected from a list of descriptor atoms corresponding to the at least one descriptor element, with at least one individual component data of each block, each descriptor atom providing a specific description of an associated-data component;

receiving, for each of a plurality of deliverable formats, at least one formatting rule associated with a selected one of the plurality of deliverable formats, wherein the at least one formatting rule specifies at least one descriptor element associated with the at least one formatting rule;

storing the plurality of blocks the data components, the associated descriptor elements, and the associated descriptor atoms in a data storage device;

storing, for each of the plurality of deliverable formats, the at least one formatting rule associated with the selected one of the plurality of deliverable formats in the data storage device;

creating an intended user profile for at least one recipient of the at least one deliverable;

determining based on the user profile a deliverable format associated with the at least one recipient;

selecting blocks associated with at least one descriptor element specified by a formatting rule associated with the deliverable format;

identifying, for at least one stored data component of each selected block, a format based on the descriptor atom associated with that stored data component and the formatting rule associated with the deliverable format;

formatting the selected data blocks and at least one stored data component of each selected block based on the identified formats; and constructing the at least one deliverable, wherein the at least one deliverable comprises the formatted data blocks and the formatted data components and wherein the at least one deliverable is associated with the single product.

26. The method as in claim 25, wherein the information sources are selected from the group consisting of graphic user interfaces, developer interviews, design specifications and white papers.

27. The method as in claim 25, wherein the intended user profile is based on domain knowledge of the user.

28. The method as in claim 25, further comprising the step of associating metatags to the descriptor elements.

29. The method as in claim 28, wherein the metatags are chosen from the group consisting of: user type, information type, format, version number, platform and product.

30. The method as in claim 29, wherein the selecting of the plurality of the at least one descriptor elements includes matching the user type metatag of the descriptor elements to the user profile.

31. The method as in claim 25, further comprising the step of selecting a format of the deliverable.

32. The method of claim 25, further comprising arranging the blocks in a sequence.

33. The method claim 25, wherein the at least one formatting rule specifies how the at least one descriptor element associated with the at least one formatting rule is selected.

* * * * *